UNITED STATES PATENT OFFICE.

ARTHUR EICHENGRÜN, OF ELBERFELD, GERMANY, ASSIGNOR TO THE FARBENFABRIKEN OF ELBERFELD COMPANY, OF NEW YORK.

PHARMACEUTICAL COMPOUND AND PROCESS OF MAKING SAME.

SPECIFICATION forming part of Letters Patent No. 615,825, dated December 13, 1898.

Application filed February 24, 1898. Serial No. 671,496. (No specimens.)

*To all whom it may concern:*

Be it known that I, ARTHUR EICHENGRÜN, doctor of philosophy, a subject of the German Emperor, residing at Elberfeld, Germany, (assignor to the FARBENFABRIKEN OF ELBERFELD COMPANY, of New York,) have invented a new and useful Improvement in the Manufacture of Pharmaceutical Compounds; and I do hereby declare the following to be an exact and clear description of my invention.

In another application, Serial No. 652,630, filed September 22, 1897, I have described a process for producing a new class of soluble protein silver substances by allowing solutions of albumoses to act on those insoluble silver compounds which are obtained by the action of solutions of silver salts or silver oxid on "protein substances." Under the expression "protein substances" I understand not only the natural protein substances—such as the different kinds of animal or vegetable albumins, albumoses, peptones, or the like—but also artificial derivatives of the said protein substances—such, for instance, as the so-called "methylene compounds"—which are obtained by acting on solutions of natural protein substances with solutions of formic aldehyde. It may be remarked that these soluble "methylene derivatives" of the natural protein substances can be obtained, for instance, in the following manner: A cold concentrated watery solution of one of the above-mentioned natural protein substances, such as egg albumen or the like, is mixed with a small quantity of formic-aldehyde solution. After about twenty-four hours the reaction will be finished. The solution is then evaporated at low temperatures. The dry residue thus obtained is the methylene derivative from egg albumen and represents a yellowish powder soluble in water. In an analogous manner the methylene derivatives of the other protein substances can be produced.

My present invention relates to the production of another class of soluble protein silver substances from the insoluble protein silver compounds above referred to. This process consists in treating the said insoluble silver compounds with solutions of the above-defined methylene compounds.

In carrying out my new process for the production of soluble protein silver substances practically I can proceed as follows: 3.2 kilos, by weight, of peptone dissolved in three liters of water are stirred into a solution of one kilo, by weight, of silver nitrate in 1.5 liters of water. The white voluminous precipitate which is separated by means of this operation is filtered, washed with water, and subsequently stirred into a warm solution prepared from twenty liters of water and 9.5 kilos, by weight, of "methylene albumen" obtained from egg albumen and formic aldehyde, as above described. By heating the resulting mixture into a water-bath at about from 70° to 80° centigrade, with continuous stirring, the insoluble silver compound is dissolved. The soluble product thus produced is separated from the solution by the addition of alcohol in the shape of a yellowish-white precipitate, which is dried *in vacuo*. When dry and pulverized, it represents a yellowish powder easily soluble in water and in dilute alkalies with a yellowish color, insoluble in alcohol, in ether, in benzene, and in chloroform. On adding a dilute solution of sodium carbonate or of an alkaline sulfide to a watery solution of the new silver compound no precipitate is separated, as is the case if an alkali is added to the solution of a silver salt. The new compound contains the silver so intimately combined with the protein molecule that it cannot be split off even by means of hydrochloric acid. Owing to this fact no precipitate is obtained on the addition of diluted hydrochloric acid (containing ten per cent. HCl) to the watery solution. On adding concentrated hydrochloric acid to the watery solution of the new compound, it is true, a precipitate results, which, however, is not silver chloride, but the unchanged silver compound, which follows from the fact that it is redissolved on the addition of water. The presence of silver contained in the new compound can easily be ascertained by heating the substance in a porcelain pan at high temperatures.

The new product exhibits in a high degree antiseptic properties without having any irritating action on the mucous membranes. For these reasons the new compound can profitably be used in medicine.

If instead of the insoluble compound from peptone and silver nitrate employed in the above example one of the other insoluble substances obtainable from a silver compound and a protein substance—such as an albumen, an albumose, a peptone, or the like—or of the soluble methylene compounds, which are producible, as above described, by the action of formic aldehyde on the last-mentioned natural protein substances, are used in my new process, very similar results are obtained. Likewise similar results are obtained if instead of the methylene compound from egg albumen mentioned in the example one of the methylene compounds obtainable from other protein substances—such as the different kinds of albumens, albumoses, and peptones—is employed in the above example.

Having now described my invention and in what manner the same is to be performed, what I claim as new, and desire to secure by Letters Patent, is—

1. The process of producing new soluble silver protein substances from the insoluble silver compounds produced by the action of silver compounds, employed for the production of silver salts of organic combinations, on protein substances, which process consists in heating the said insoluble silver compounds at about 70° to 80° centigrade with solutions of methylene compounds obtained from natural protein substances, filtering the solutions thus obtained, separating therefrom the new soluble compounds by means of alcohol, and drying the resulting precipitate at low temperatures, substantially as hereinbefore described.

2. As a new article of manufacture the new soluble silver protein substances obtainable from insoluble silver protein substances and the soluble methylene compounds derived from natural protein substances and formic aldehyde, being, when dry and pulverized, yellowish powders insoluble in alcohol, in ether, in benzene, and in chloroform, dissolving in water and in dilute alkalies, yielding a yellowish solution, and containing silver so intimately combined with the protein molecule, that the aqueous solution does not separate any precipitate on the addition of dilute alkalies or dilute alkaline sulfides, or of dilute hydrochloric acid, containing about ten per cent. HCl, substantially as described.

In testimony whereof I have signed my name in the presence of two subscribing witnesses.

ARTHUR EICHENGRÜN.

Witnesses:
R. E. JAHN,
OTTO KÖNIG.